(12) United States Patent
Naudus (10) Patent No.: US 6,412,006 B2
(45) Date of Patent: *Jun. 25, 2002

(54) METHOD AND APPARATUS FOR SENDING DELAY SENSITIVE INFORMATION ASSISTED BY PACKET SWITCHED NETWORKS

(75) Inventor: Stanley T. Naudus, Springfield, VA (US)

(73) Assignee: 3Com Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 42 days.

(21) Appl. No.: 09/021,249

(22) Filed: Feb. 10, 1998

(51) Int. Cl.[7] .......................... H04L 12/28; H04L 12/12; G06F 13/14
(52) U.S. Cl. .................. 709/227; 370/437; 709/239; 709/242
(58) Field of Search ................. 709/224, 225, 709/238, 239, 241, 242, 227, 228; 370/437, 352, 409, 410, 465

(56) References Cited

U.S. PATENT DOCUMENTS

| | | | | |
|---|---|---|---|---|
| 4,996,685 A | * | 2/1991 | Farese et al. | 370/352 |
| 5,321,815 A | * | 6/1994 | Bartolanzo, Jr. et al. | 709/241 |
| 5,426,427 A | * | 6/1995 | Chinnock et al. | 709/239 |
| 5,481,673 A | * | 1/1996 | Michelson | 709/242 |
| 5,528,595 A | | 6/1996 | Walsh et al. | 370/402 |
| 5,577,105 A | | 11/1996 | Baum et al. | 379/93.05 |
| 5,675,742 A | * | 10/1997 | Jain et al. | 709/226 |
| 5,790,770 A | * | 8/1998 | McClure et al. | 709/231 |
| 5,881,243 A | * | 3/1999 | Zaumen et al. | 709/241 |
| 5,892,924 A | * | 4/1999 | Lyon et al. | 709/245 |
| 5,935,215 A | * | 8/1999 | Bell et al. | 709/239 |
| 5,982,780 A | * | 11/1999 | Bohm et al. | 370/450 |
| 6,041,041 A | | 3/2000 | Ramanathan et al. | |
| 6,075,791 A | * | 6/2000 | Chiussi et al. | 370/412 |
| 6,091,714 A | * | 7/2000 | Sensel et al. | 370/260 |
| 6,105,068 A | | 8/2000 | Naudus | |
| 6,122,254 A | * | 9/2000 | Aydemir et al. | 370/235 |
| 6,130,879 A | * | 10/2000 | Liu | 370/230 |
| 6,130,880 A | | 10/2000 | Naudus et al. | |
| 6,137,792 A | * | 10/2000 | Jonas et al. | 370/354 |
| 6,144,641 A | * | 11/2000 | Kaplan et al. | 370/465 |
| 6,157,648 A | * | 12/2000 | Voit et al. | 370/354 |
| 6,175,870 B1 | * | 1/2001 | Gawlick et al. | 709/227 |
| 6,182,125 B1 | | 1/2001 | Borella et al. | |
| 6,260,072 B1 | * | 7/2001 | Rodriguez-Moral | 709/241 |

* cited by examiner

*Primary Examiner*—Mark H. Rinehart
*Assistant Examiner*—Marc D. Thompson
(74) *Attorney, Agent, or Firm*—McDonnell Boehnen Hulbert & Berghoff; Stephen Lesavich

(57) ABSTRACT

A method and apparatus for sending delay sensitive information assisted by packet switched networks for network nodes in a computer network. Delay sensitive information such as voice information is sent over higher cost delay sensitive connections. Control and status information for the delay sensitive connections is sent in control messages over lower cost packet switched connections to the nodes in the computer network. Information in the control messages is stored in status tables on the network nodes. The status table is used by network nodes to determine the status of any delay sensitive connections in the computer network and is used to establish a lowest cost connection path or a desired quality of service connection path when a delay sensitive connection between network nodes is requested. Sending delay sensitive control and status information over the lower cost packet switch connections to the network nodes and using status tables on the network nodes to establish delay sensitive connections significantly decreases the costs associated with using delay sensitive connections.

16 Claims, 6 Drawing Sheets

METHOD AND APPARATUS FOR SENDING DELAY SENSITIVE INFORMATION ASSISTED BY PACKET SWITCHED NETWORKS

FIELD OF INVENTION

The present invention relates to control signaling and data transfer in a computer network. More specifically, it relates to a method and apparatus for sending delay sensitive information on a higher cost network connection while sending non-delay sensitive control and status information on a lower cost network connection.

BACKGROUND OF THE INVENTION

As is known in the art, a variety of computing devices are often connected together to form a computer network. The computer network may be a Local Area Network ("LAN") that connects devices over a small geographical area, or a Wide Area Network ("WAN") that connects devices over a large geographical area. The connection strategy used to connect devices in a network is called the "network topology."

Devices in a network are typically connected with circuit switched, message switched, and packet switched connections. A circuit switched connection is a dedicated communications circuit between two devices. The communications circuit may be a physical or a virtual circuit connection. A message switched connection establishes a non-dedicated message route when a unit of information is sent. Different units of information may travel over different routes in a message switched connection. A packet switched connection divides original information into multiple packets on the transmitting end, transmits the packets separately, and re-assembles the packets into the original information on the receiving end. The transmission route may be dedicated (e.g., virtual circuit) or non-dedicated (e.g., datagram) in a packet switched connection.

Additional devices are typically required to make connections between dissimilar network topologies. For example, repeaters, bridges, gateways and routers are used to connect networks with different topologies. Repeaters copy individual bits between network topologies. Bridges store and forward data frames between network topologies. Gateways store and forward data packets between dissimilar network topologies. Routers translate differences between network protocols and route data packets to the appropriate device on a network topology.

Computer networks are often created that contain multiple network nodes or network stations. Each node or station may be a network itself and contain multiple computing devices. For example, a WAN can be created with multiple nodes where each node comprises a LAN with multiple computing devices. The nodes in the network are typically connected with one or more connections with dedicated functionalities.

A network connection with a dedicated functionality is often optimal for a selected group of functions, but inefficient for other related functions. For example, delay sensitive connections are optimized for information that is sensitive to delays in transmission, such as voice information, but often inefficient for high bandwidth applications that periodically send large bursts of data. Packet switched networks provide optimized bandwidth utilization for applications that periodically send large bursts of data, but this optimization and the use of error correction techniques (e.g., retransmission) can cause large transmission variations and make such a connection ill suited for information that is delay sensitive.

There are several problems associated with connecting nodes in a computer network with connections with dedicated functionalities. Delay sensitive information is typically sent over dedicated connections that are higher priced connections (e.g., charged time-of-use fees). Delay sensitive information includes voice, real-time video and other information sensitive to transmission delays. Such information can not be sent over connections that may have a large transmission delay without loss of information or loss of quality of information. Non-delay sensitive information and large bursts of data are typically sent over dedicated packet switched connections that are lower priced connections (e.g., charged monthly connection or bandwidth fees).

Control and status information used to control the delay sensitive connections is sent over the higher priced delay sensitive connections along with delay sensitive information. This significantly increases the overall cost of using the delay sensitive connections.

As is known in the art, control and status information can be sent via packet switched networks associated with a delay sensitive network (i.e., a circuit switched network) to decrease the overall cost of using the delay sensitive network. For example, Signaling System Seven ("SS7") known in the telephony arts, sends control and status information for circuit switched connections via a separate packet switched signaling connection. However, use of SS7 requires the computer network use special SS7 packet switching hardware and software on network nodes. This significantly increases the cost of the network. In addition, the SS7 hardware and software is not directly accessible by user applications making SS7 use impractical for most user-to-user network applications.

Delay sensitive networks, such as circuit switched networks typically use Time Division Multiplexing ("TDM"), Frequency Division Multiplexing ("FDM") statistical multiplexing, and other multiplexing techniques along with compression to transmit multiple analog or digital channels over a single delay sensitive connection. Sending control and status information over the delay sensitive connection also decreases the number of available channels that can be used to send delay sensitive information. This may cause congestion or delay problems in the delay sensitive connection and further increase the cost of using the higher priced circuit switched network.

Another problem with using dedicated connections is that individual nodes in a computer network may not have information about what delay sensitive connections are available to other nodes in the network and the status of such connections. When a node desires to communicate with another node in the network with a delay sensitive connection, it should be able to effectively make new delay sensitive connection decisions at the lowest possible cost. For example, a first node desires to communicate with a third node via a delay sensitive connection. The first node currently has no direct delay sensitive connection to the third node. However, the first node has a direct delay sensitive connection to a second node, and the second node has a direct delay sensitive connection to the third node. The first node could establish an indirect delay sensitive connection to the third node through the second node if the first node had information about the delay sensitive connections of the second node and the status of such connections (e.g., all delay sensitive channels are busy or there are delay sensitive channels available). A connection from the third node, to the second node, to the first node with an indirect multi-hop delay sensitive connection may be more cost effective than establishing a direct delay sensitive connection between the first and third nodes (e.g., local call instead of a long distance call).

SUMMARY OF THE INVENTION

In accordance with an illustrative embodiment of the present invention, some of the problems associated with using dedicated connections to connect nodes in a computer network are overcome. A method and apparatus are described for sending routed delay sensitive information assisted by packet switched networks. The method includes a computer network with multiple network nodes where the network nodes have a packet switched connection to a packet switched network. In an illustrative embodiment of the present invention, the packet switched network is the Internet. However, other packet switched networks can also be used.

Selected network nodes have a delay sensitive connection to a delay sensitive network for sending and receiving delay sensitive information such as voice and real-time video. The delay sensitive connections include multiple delay sensitive connection channels. A selection input is received on a first network node to change the status of a delay sensitive connection between the first network node and a second network node (e.g., requesting a new delay sensitive connection). The status of the delay sensitive connection is changed based on the selection input (e.g., establishing a delay sensitive connection). A control message with a predetermined protocol is sent on the packet switched network to the other network nodes in the computer network indicating the change in status of the delay sensitive connection. The control messages are used by other network nodes to make connection decisions and establish the lowest cost delay sensitive connections. The lowest cost delay sensitive connection may be an indirect, multi-hop delay sensitive connection and may utilize idle delay sensitive channels on a previously established delay sensitive connection between two network nodes. The lowest cost delay sensitive connection may also be a shortest path delay sensitive connection, or a lowest cost delay sensative connection with a desired quality of service.

The foregoing and other features and advantages of an illustrative embodiment of the present invention will be more readily apparent from the following detailed description, which proceeds with references to the accompanying drawings.

DETAILED DESCRIPTION OF PREFERRED EMBODIMENTS

Figure 1:
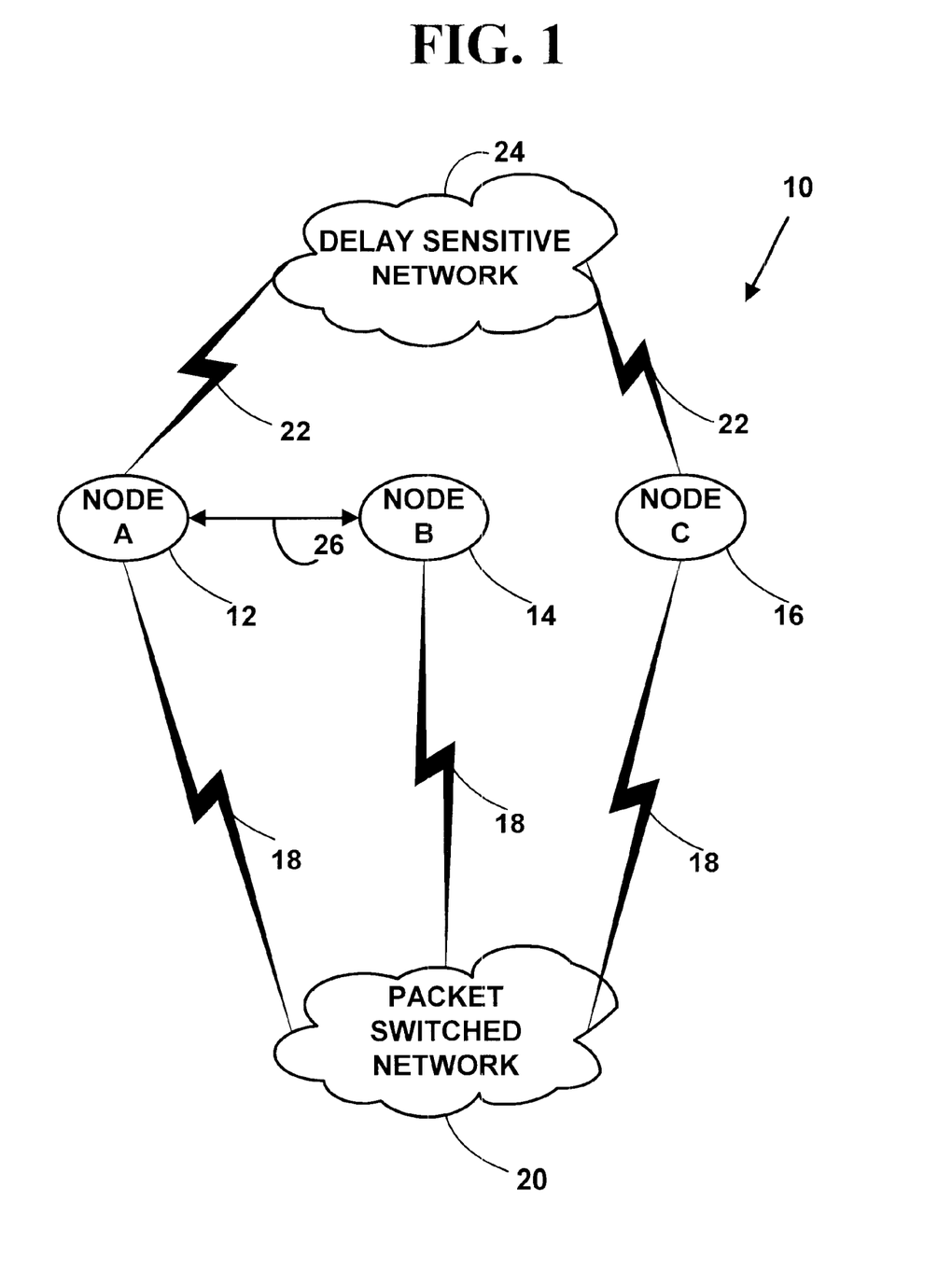
FIG. 1 is a block diagram illustrating a computer network for an illustrative embodiment of the present invention.

FIG. 1 is a block diagram illustrating a computer network 10 for an illustrative embodiment of the present invention.

The computer network 10 includes multiple network nodes (12, 14, 16). Only three network nodes are shown in FIG. 1. However the present invention is not limited to three network nodes and more or fewer network nodes may be used.

An operating environment for network nodes (12,14,16) of the present invention includes a processing system with at least one high speed Central Processing Unit ("CPU"), in conjunction with a memory system, an input device, and an output device. These elements are interconnected by a bus structure.

The CPU is of familiar design and any of a variety of processors, including those from Digital Equipment, Sun, MIPS, IBM, Motorola, NEC, Intel, Cyrix, AMD, Nexgen and others are equally preferred for CPU. Although described with one CPU, alternatively multiple CPUs may be used.

The memory system includes main memory and secondary storage. The main memory is high-speed random access memory ("RAM") and read only memory ("ROM"). Main memory can include any additional or alternative high-speed memory device or memory circuitry. Secondary storage takes the form of long term storage, such as ROM, optical or magnetic disks, organic memory or any other volatile or non-volatile mass storage system. Those skilled in the art will recognize that the memory system can comprise a variety and/or combination of alternative components.

As is familiar to those skilled in the art, the processing system further includes an operating system and at least one application program. The operating system is a set of software instructions, which controls the CPU's operation and the allocation of resources. The application program is a set of software instructions that performs a desired task desired making use of computer resources made available through the operating system. Both are resident in the memory system.

In accordance with the practices of persons skilled in the art of computer programming, the present invention is described below with reference to acts and symbolic representations of operations that are performed by processing system, unless indicated otherwise. Such acts and operations are sometimes to as being "computer-executed". It will be appreciated that the acts and symbolically represented operations include the manipulation of electrical signals by the CPU. The electrical system represent data bits which cause a resulting transformation or reduction of the electrical signal representation, and the maintenance of data bits at memory locations in the memory system to thereby reconfigure or otherwise alter the processing system's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, and any other volatile or non-volatile mass storage system readable by the computer. The computer readable medium includes cooperating or interconnected computer readable media, which exist exclusively on processing system or be distributed among multiple interconnected processing systems that may be local or remote to processing system.

Returning to FIG. 1, network nodes (12,14,16) have a packet switched connection 18 to a packet switched network 20. In an illustrative embodiment of the present invention, the packet switched connection is a Transmission Control Protocol ("TCP")/Internet Protocol ("IP") connection and the packet switched network is the Internet. However, other packet switched connections and networks could also be used (e.g., user datagram protocol ("UDP")/IP, an intranet, X.25, Frame Relay, or Internet Packet eXchange ("IPX") network).

Network nodes (12, 16) in network 10 have delay sensitive connections 22 to a delay sensitive network 24. The delay sensitive connection is used for sending and receiving information such as voice information and real-time video information that is highly sensitive to transmission delays. In an illustrative embodiment of the present invention, the delay sensitive connection is a circuit switched connection to a Public Switched Telephone Network ("PSTN") such as those provided by AT&T, GTE, Regional bell Companies, and others. The delay sensitive connection is separate from packet switched network 20. Connections 22 may be low speed analog or digital delay sensitive connections or high-speed delay sensitive connections. (e.g., T1, DS1, DS3). However, other delay sensitive networks could also be used for the delay sensitive connection. For example, a private circuit switched network, a wireless or cellular network, an Integrated Services Digital Network ("ISDN"), Asynchronous Transport Mode ("ATM"), or Internet Protocol Flows, could also be used.

In another embodiment of the present invention, delay sensitive network 24 is part of packet switched network 20, and is not a separate network. In such an embodiment, the packet switched network is capable of offering high Quality of Service ("QoS") delay sensitive connections along with lower quality, larger delay connections.

The delay sensitive connections include multiple delay sensitive channels. For example, multiplexing techniques known in the art such as Frequency Division Multiplexing ("FDM"), Time Division Multiplexing ("TDM"), statistical multiplexing, and other multiplexing techniques are used to send analog and digital data in multiple channels over the same delay sensitive connection. Compression techniques known in the telephony arts are used to compress the delay sensitive information sent over the multiple delay sensitive channels. If the delay sensitive connection is a high quality of service packet switched connection, multiple packet "channels" may be used.

Selected network nodes (12, 14) have an optional dedicated direct connection 26 which may be circuit switched, message switched, or packet switched. The network nodes may optionally be connected to other networks such as a LAN, a Private Branch eXchange ("PBX"), an intranet, or connected to other devices such as bridges, routers and gateways (not shown in FIG. 1). The network nodes (12, 14, 16) may be local or remote to each other.

Figure 2:
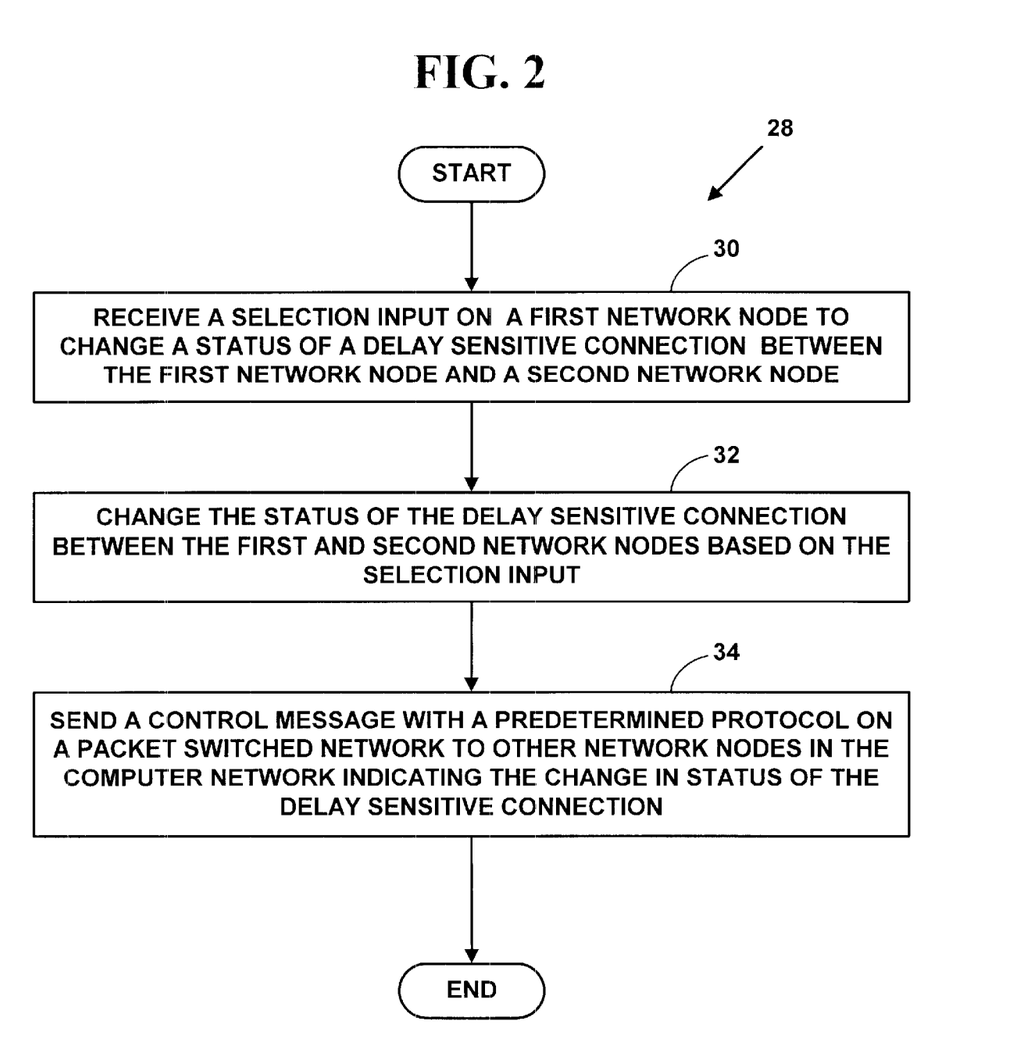
FIG. 2 is a flow diagram illustrating a method for determining the status of a delay sensitive connection from any network node in a computer network.

FIG. 2 is a flow diagram illustrating a method 28 for determining the status of a delay sensitive connection from any network node (12, 14, 16) in computer network 10. At step 30, a selection input is received on a first network node to change the status of a delay sensitive connection between the first network node and a second network node (e.g., a request to make a delay sensitive connection). Status of the delay sensitive connection is changed based on the selection input at step 32 (e.g., a delay sensitive connection is established, and an individual channel is chosen). A control message with a predetermined protocol is sent on the packet switched network from the first network node over the packet switched connection to the other network nodes in the computer network indicating the change in status of the delay sensitive connection at step 34. The control message may be a single broadcast control message sent to each of network nodes, or multiple individual control messages sent to each of the network nodes.

The nodes (12, 14, 16) in computer network 10 store control status information in a status table that is dynamically updated as the nodes receive control messages. However, other data structures could also be used to store delay sensitive connection status information. The protocol, control messages and status table will be explained below.

Control messages may be delayed or lost if packet switched network 20 suffers from network latency and reliability problems. In an alternative embodiment of the present invention, the control messages are also sent over a second packet switched connection. This dual-path transmission helps eliminate the network latency and reliability problems in the packet switched network. Standard message number sequencing is used with dual-path transmission to detect duplicate messages and eliminate race conditions.

Method 28 allows any node in computer network 10 to determine the availability of delay sensitive connection channels on remote nodes and chose a connection that generates a least cost connection path (e.g., an indirect multi-hop delay sensitive connection instead of a direct delay sensitive connection) along with a requested quality of service. The least cost connection path may also be a shortest path connection or a least cost connection with a desired QoS. The control messages contain routing information, and other cost information to allow a network node to determine the least cost connection path alternative. The control messages are sent over the packet switched network instead of the delay sensitive network saving additional costs.

Figure 3A:
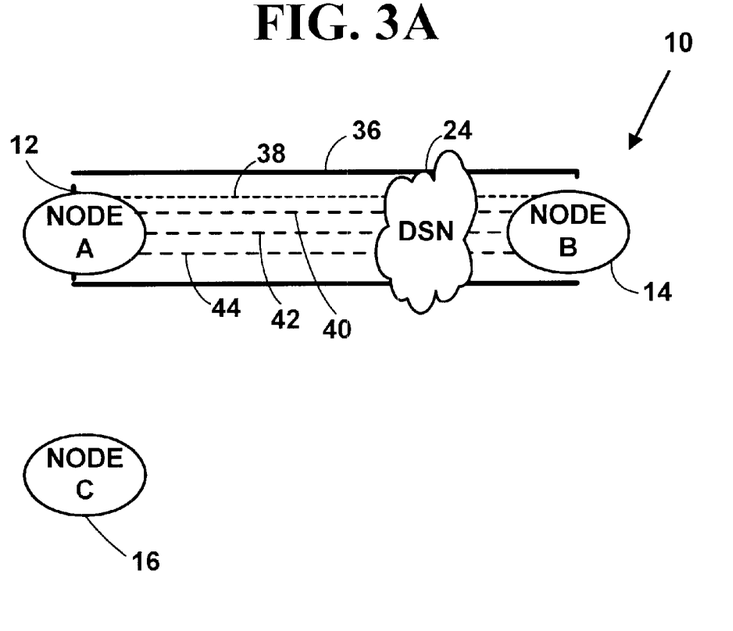
FIGS. 3A and 3B are block diagrams illustrating use of the method of FIG. 2.
Figure 3B:
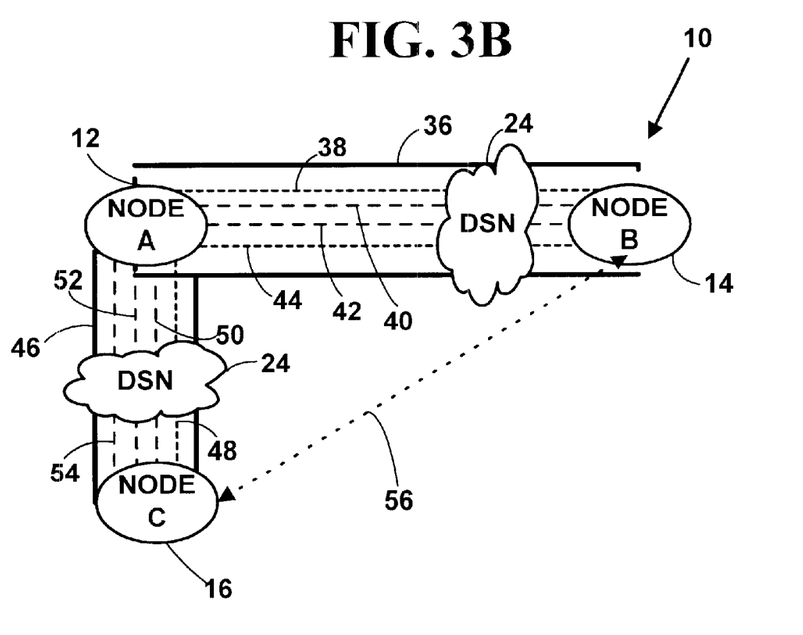

FIGS. 3A and 3B are block diagrams illustrating aspects of method 28 of FIG. 2. As is shown in FIG. 3A, node A 12 in computer network 10 receives a selection input at step 30 (FIG. 2) to make a voice call to node B 14 via a delay sensitive connection. A delay sensitive connection 36 is established between node A 12 and node B 14 via delay sensitive network 24 with multiple delay sensitive channels, four of which are illustrated (38, 40, 42, 44) in FIG. 3A. Only four channels are illustrated in FIG. 3A. However, the invention is not limited to four channels, and more or fewer channels can be used. In FIG. 3A, the remaining channels (40, 42, 44) are not currently in use and are illustrated with a different type of dashed line. The establishment of connection 36 indicates a change in status at step 32 (FIG. 2) of connection 36. A first control message with a predetermined protocol is sent at step 34 (FIG. 2) to nodes (14,16) in computer network 10 via packet switched connection 18 (not shown in FIG. 3A) to indicate the change in status of connection 36. Node A 12 can send a message to itself over the packet switched network, or simply update delay sensitive channel information stored in its status table since it received the selection input at step 30 (FIG. 2).

A voice call is established through delay sensitive network 24 between node A 12 and node B 14 over an individual delay sensitive channel 38. The establishment of the voice call changes the status at step 32 (FIG. 2) of channel 38. A second control message is sent at step 34 (FIG. 2) over packet switched network 20 to other nodes in the network. Nodes A, B and C (12, 14, 16) all have information about delay sensitive connection 36, active channel 38, and idle channels (40, 42, 44) on delay sensitive connection 36.

As is shown in FIG. 3B, node C 16 now desires to make a voice call to node B 14. Node C 16 has status information in its status table as a result of a control messages indicating that node A 12 has a delay sensitive connection 36 with three available channels (40, 42, 44) to node B 14. In addition, the status table information allows node C 16 to determine that a direct call to node B 14 is more expensive than an indirect call to node B 14 via node A 12. For example, the call from A to B is local, the call from C to A is local, while the call from C to B is long distance.

After consulting its status table, node C 16 establishes a delay sensitive connection 46 to node A 12 via delay sensitive network 24. One channel 48 of the available delay sensitive channels (50, 52, 54) in delay sensitive connection 46 is used to establish the voice call.

Node C 16 requests that node A 12 make an additional delay sensitive connection to node B 14 with a second available channel 44. Node C 16 has a virtual connection 56 to node B 14 with an indirect multi-hop delay sensitive connection (48, 44) at a lowest possible cost. Method 28 (FIG. 2) is used to send control messages to indicate the change in status for creating the delay sensitive connections 36 and 46, and the change in delay sensitive connection channels 38, 44, and 48. The control messages are stored in a status table such as the example status table shown in Table 2 below.

The control messages used with method 28 are sent with a Channel State Update Protocol and the message types shown in Table 1. However, more or fewer message types could be used.

TABLE 1

| | |
|---|---|
| Circuit State Update Message | This message type is similar to Link State Update Messages of the Open Shortest Path First ("OSPF") or Private Network-to-Network Interface ("P-NNI") used by ATM. This message type distributes channel state information to all network nodes on the packet switched network. This message includes routing, connection, call preference and cost information for the network node that sends it. |
| Circuit Establishment Direction Message | This message type directs remote nodes to establish new delay sensitive connections. |
| Call Establishment Message | This message type is used to indicate the status of a delay sensitive channel in a delay sensitive connection. |

The Channel State Update Protocol is used to send control messages over packet switched network 20. In an illustrative embodiment of the present invention, the Channel State Update Protocol is sent over the Internet as a data packet encapsulated in a Transmission Control Protocol ("TCP") packet that is typically sent via the IP protocol. TCP provides a reliable connection-oriented, user-to-user service (i.e., acknowledged and guaranteed delivery of packets). However, other protocols could also be used to send the Channel State Update Protocol data packets.

In an alternative embodiment of the present invention, the Channel State Update Protocol data packets could also be sent directly via the User Datagram Protocol (UDP), thus sending data in an unreliable, connectionless datagram format (i.e., not acknowledged and no guaranteed delivery of packets).

In the OSI seven-layer network model known in the art, TCP is often considered a transport layer protocol and IP is considered a network layer protocol. The OSI model consists, from lowest to highest of physical, data link, network, transport, session, presentation and application layers. Thus, under the OSI scheme, the Channel State Update Protocol can be sent in the network layer, or in layers above the network layer depending on the reliability of packet delivery that is desired.

A Channel State Update Protocol data packet comprises a header segment, which includes fields for a message source, message destination, sequence number, message type, message options and checksum, and a data segment for storing actual message data. However, more or fewer fields can be used in the Channel State Update Protocol header.

Figure 4:
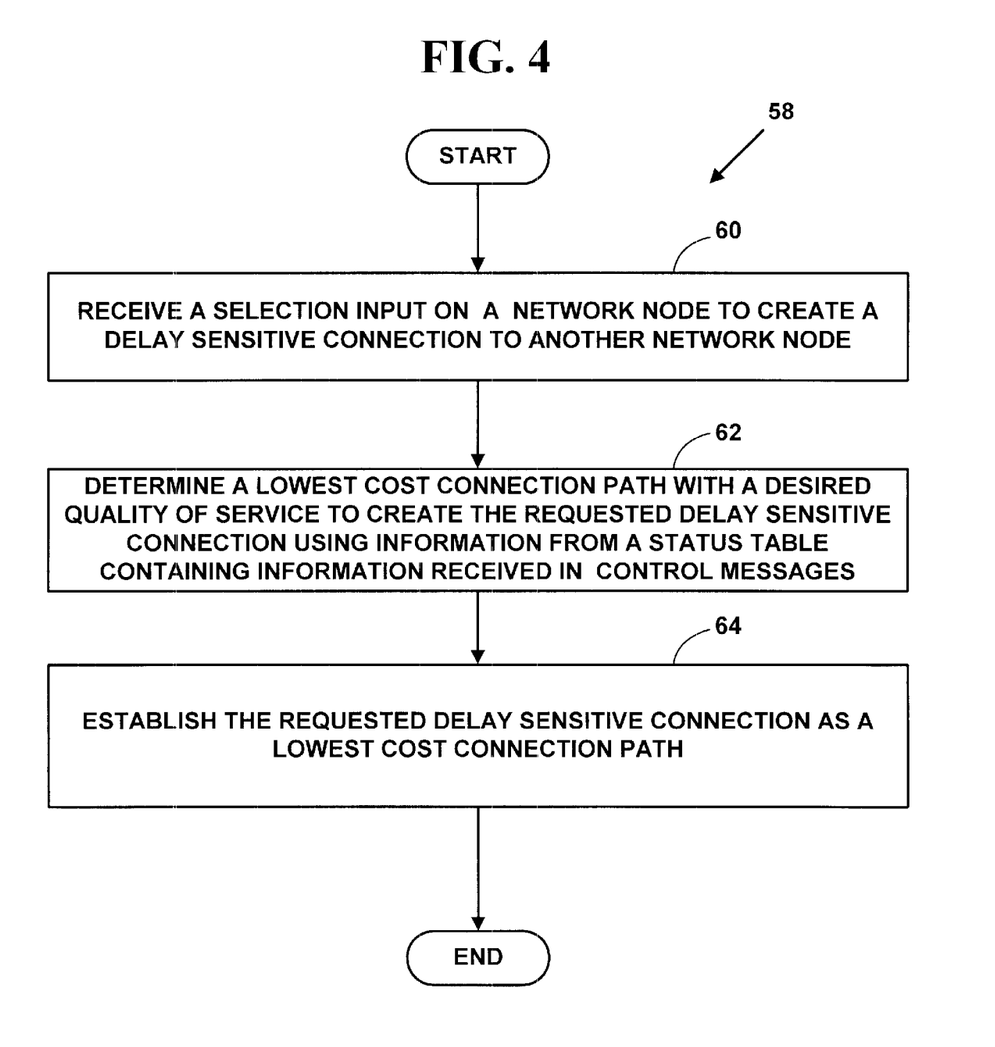
FIG. 4 is a flow diagram illustrating a method for using control information to determine a lowest cost connection path.

FIG. 4 is a flow diagram illustrating a method 58 for using control information to determine a lowest cost connection path. At step 60, a selection input is received on a node in the computer network requesting a delay sensitive connection to another node. Information in the status table on the node is used at step 62 to determine the lowest cost path along with a desired quality of service to complete the delay sensitive connection request. QoS includes a smaller delay (e.g., a non-routed link) or a higher quality transmission channel.

The determination at step 62 includes determining general preference information for handling the request, the cost information between nodes, and the QoS. For example, the preference may be to always check for the availability of a delay sensitive channel with a first desired QoS on a designated network node first, as the designated node typically will have one or more delay sensitive connections already established with available delay sensitive channels.

The cost information and QoS is used to determine if indirect multi-hop connections can be used instead of direct single hop connections (e.g., multi-hop local connections instead of one direct long distance connection). The cost information can also be used to determine a shortest path connection route. An exemplary status table is shown in Table 2 for the network nodes from FIGS. 3A and 3B. However, other layouts could also be used for the status table with more or fewer table columns. For example, the status table may include network addresses of other nodes in computer network 10, direct dial phone numbers for network nodes, or phone numbers for a PBX attached to network nodes in computer network 10.

TABLE 2

| Node | Available Delay Sensitive Channels | Delay Sensitive Node Connections | Preferred Paths | Connect Costs |
|---|---|---|---|---|
| A | 2<br>QoS: 1,2 | B,C | B:B<br>A:A | B $1.00<br>C $1.00 |
| B | 2<br>QoS: 1,2 | A | A:A<br>C:A–C | A $1.00<br>C $14.00<br>A–C $2.00 |
| C | 3<br>QoS: 1,2,3 | A | A:A<br>B:A–B | A $1.00<br>B $14.00<br>A–B $2.00 |

Returning to FIG. 4, the lowest cost, delay sensitive connection path is established using information from the status table at step 64. This connection path is typically an indirect, multi-hop path through multiple network nodes. However, the connection can also be a direct, single-hop path if this is the lowest cost path (e.g., no other delay sensitive connections have been previously made to the desired network node). The lowest cost connection path can also be a shortest connection path, or a desired QoS path.

Since the control messages are sent over the lower cost packet switched network to the network nodes, network nodes which do not currently have delay sensitive connections can immediately determine the status and availability of higher cost, delay sensitive channels. The status information is determined accessing the internal status table which is used to store information from control messages. No additional messages need be sent to any other nodes in the computer network to determine status of delay sensitive connections. This saves significant amounts of time and computer resources.

Figure 5:
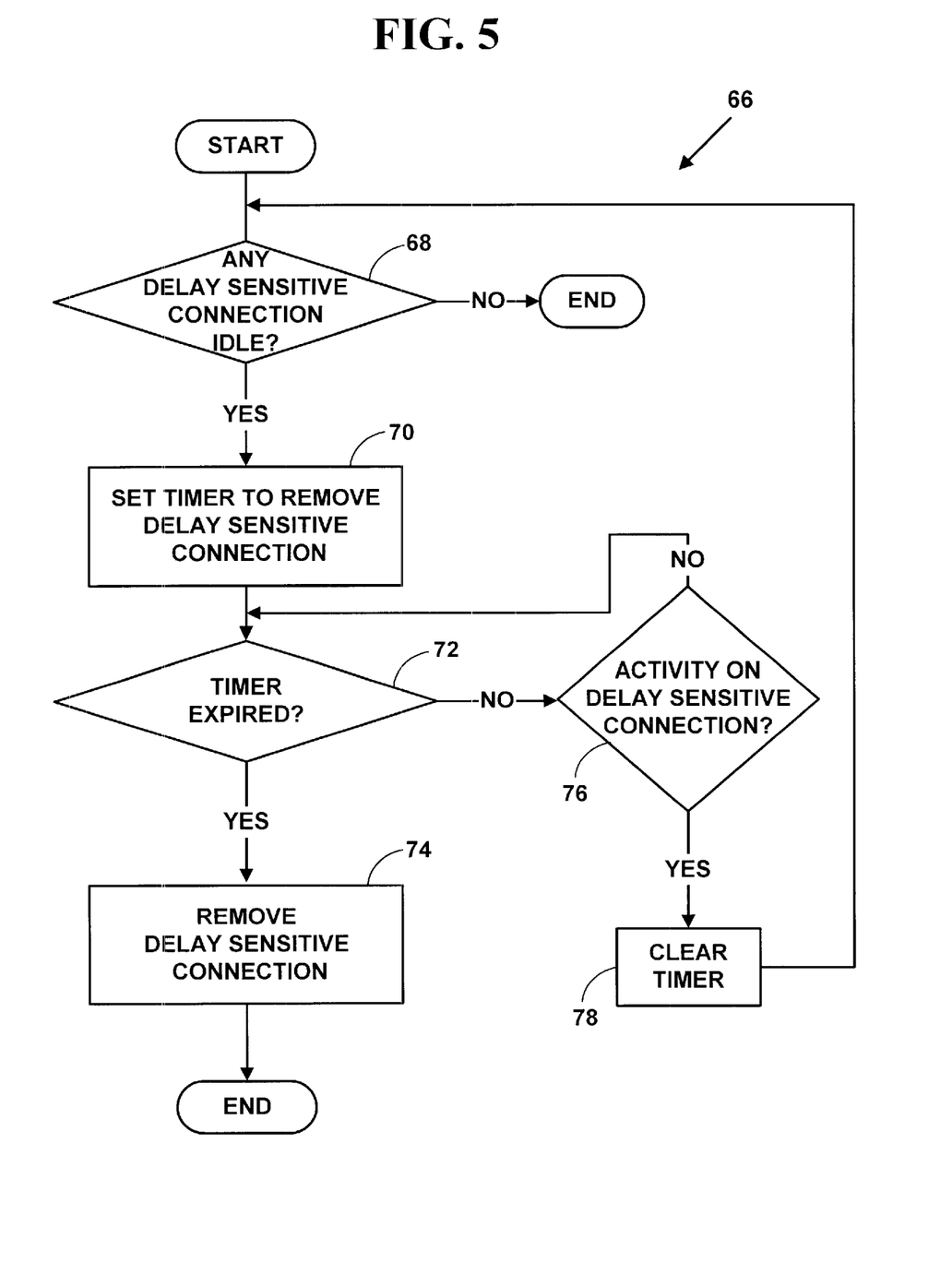
FIG. 5 is a flow diagram illustrating a method for determining when to release a delay sensitive connection.

To further lower costs in computer network 10, a predictive release function is used by nodes to remove a delay sensitive connection to another node when none of the delay sensitive channels are being utilized. FIG. 5 is a flow diagram illustrating a method 66 for determining when to release a delay sensitive connection.

At step 68 in FIG. 5, a network node examines the status table to determine if any delay sensitive connections connected to the node have all channels in an idle state. If so, at step 70 a timer is set that will be used to remove the delay sensitive connection. The amount of time set on the timer is determined according to statistics gathered from previous usage time for the delay sensitive connection, or the type of delay sensitive connection being used. In one embodiment of the present invention, the statistical information is collected and processed by one or more nodes in computer network 10 and broadcast periodically to remaining nodes. An individual node can also collect and process its own statistical information. The statistical information includes time required for establishing a delay sensitive connection, connection duration, QoS, and the time required for releasing the delay sensitive connection.

Release times vary dramatically for delay sensitive connections in computer network 10. For example, a circuit switched delay sensitive connection may be released in 5 milli-seconds after all circuit switched channels are idle. In contrast, for an ATM or IP Flow delay sensitive connection which have high associated costs for establishing a connection, a release may take place 5 seconds after all channels are idle.

Returning to FIG. 5, if the timer expires at step 72, then the delay sensitive connection is removed at step 74. If the timer has not expired, the status table is checked again at step 76 for activity on the delay sensitive connection. If there is activity on the delay sensitive connection, then the timer is canceled at step 78. If there is still no activity on the delay sensitive connection the node waits for the timer to expire by continuing other processing tasks. The loop beginning with step 68 is repeated at regular intervals on the nodes in computer network 10. Method 66 ensures that the higher cost delay sensitive connections will be removed in a timely manner when they are not being actively used. This saves additional costs for operating computer network 10.

Figure 6:
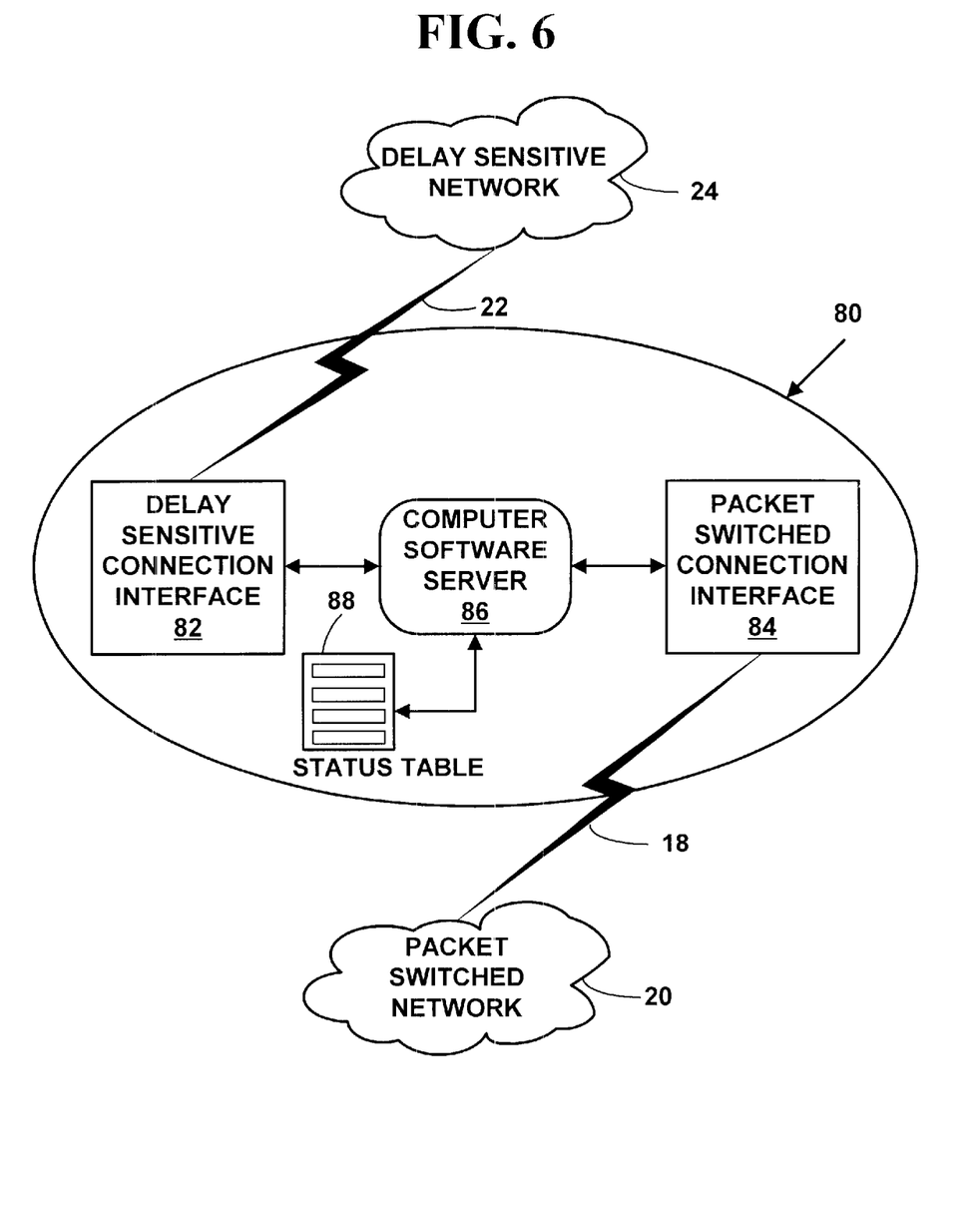
FIG. 6 is a block diagram illustrating an apparatus for implementing an illustrative embodiment of the present invention.

FIG. 6 is a block diagram illustrating an apparatus 80 for implementing an illustrative embodiment of the present invention. Apparatus 80 is used as a network node (e.g., 12, 14, 16) in computer network 10. As is shown in FIG. 6, apparatus 80 includes multiple network connection interfaces 82, 84. Methods 28, 58, and 66 described above are implemented as computer software instructions in an application program stored in a memory of apparatus 80.

The application program comprises a computer software server 86. Computer software server 86 is implemented in the C/C++ programming language. However, other programming languages could also be used.

Network connection interface 82 is used to connect 18 apparatus 80 to packet switched network 20. Network connection interface 84 is used to connect 22 apparatus 80 to delay sensitive network 24. Additional network connection interfaces to make other types of network connections could also be used for apparatus 80. In an illustrative embodiment of the present invention, interface 82 is connected to the Internet, and interface 84 is connected to the PSTN to send and receive compressed voice and real-time video information. However, other network connections could also be used.

In one specific exemplary preferred embodiment of the present invention, apparatus 80 is implemented in a "Total Control Telephony Chassis" by U.S. Robotics Corporation, of Skokie, Ill. The Total Control Telephony Chassis includes multiple network interface cards connected by a common bus. See "Modem Input/Output Processing Techniques," U.S. Pat. No. 5,528,595, granted to Dale M. Walsh et al., incorporated herein by reference. Interfaces 82 and 84 are any network interfaces by U.S. Robotics or others that provide packet switched connection capabilities and delay sensitive connection capabilities. For example, delay sensitive interface 82 is U.S. Robotics T1 interface card, U.S. Robotics ISDN interface card, or U.S. Robotics Quad Modem card. Packet switched interface 84 is a U.S. Robotics T1 interface card with a software TCP/IP protocol stack. Computer software server 86 is added to existing software in the Total Control Telephony Chassis to implement methods 28, 58, and 66 described above to accomplish the present invention. However, apparatus 80 can also be implemented in other devices with other hardware and software configurations and is not limited to implementation in a U.S. Robotics Total Control Chassis.

The present invention may offer several advantages over the prior art. It distributes status information for delay sensitive connections to nodes in a computer network via control messages. The control messages are sent via a lower cost packet switched connection instead of the higher cost delay sensitive connection. Network nodes use the information in the control messages to determine and establish a least cost path when it is necessary to make a delay sensitive connection. The least cost path may be an indirect path utilizing idle channels on existing delay sensitive connections between selected network nodes. The network nodes also monitor their own delay sensitive connections and terminate the connections when all channels in the connection are idle for a specified period of time. The present invention significantly lowers the operating costs of a computer network since the higher cost delay sensitive connections are used in an optimal manner.

It should be understood that the programs, processes, methods and apparatus described herein are not related or limited to any particular type of computer apparatus (hardware or software), unless indicated otherwise. Various types of general purpose or specialized computer apparatus may be used with or perform operations in accordance with the teachings described herein.

In view of the wide variety of embodiments to which the principles of my invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

The claims should not be read as limited to the described order or elements unless stated to that effect. Therefore, all embodiments that come within the scope and spirit of the following claims and equivalents thereto are claimed as my invention.

I claim:

1. In a computer network with a plurality of network nodes, the network nodes having a packet switched connection to a packet switched network, and selected ones of the network nodes having a delay sensitive connection to selected other ones of the network nodes, wherein the delay sensitive connection includes a plurality of individual delay sensitive channels, a method for determining a status of a delay sensitive connection from any network node in the computer network, the method comprising the following steps:

receiving a selection input on a delay sensitive connection on a first network node to change a status on a delay sensitive connection between the first network node and a second network node;

changing a status from the first network node on one or more of the plurality of individual delay sensitive channels on the delay sensitive connection based on the selection input; and sending a control message with a predetermined protocol on the packet switched network from the first network node to the other network nodes in the computer network indicating the change in status of the delay sensitive connection, wherein information received in the control message is stored in status tables on the plurality of network nodes, and wherein a selected network node determines with a status table a lowest cost delay sensitive connection path between the selected network node and any other network node in the computer network, and wherein the lowest cost delay sensitive connection path is a shortest delay sensitive connection path with a desired quality of service.

2. A computer readable medium having stored therein instructions for causing a central processing unit in a network node to execute the method of claim 1.

3. The method of claim 1 wherein a third network node is connected to the first network node with a delay sensitive connection, but is not connected to the second network node with a delay sensitive connection, further comprising:

determining from the third network node with the control message if a delay sensitive connection channel from the first network node to the second network node is available, and if so, establishing an indirect delay sensitive connection from the third network node to the second network node using a delay sensitive connection channel from the delay sensitive connection between the third network node and the first network node, and the available delay sensitive channel between the first network node and the second network node.

4. The method of claim 1, further comprising:

dynamically updating the status tables upon receiving additional control messages; and determining from a network node with a status table current status information for any delay sensitive connections in the computer network.

5. The method of claim 1 wherein information contained in the control message includes any of: network node routing information; network node connection preference information; network node connection cost information; network node addresses; network node dial numbers quality of service; or network node Private Branch Exchange dial numbers for the delay sensitive connection.

6. The method of claim 1 wherein the changing step includes any of: establishing a connection on an individual channel on the delay sensitive connection; releasing an individual channel on the delay sensitive connection; or changing the characteristics of an individual channel on the delay sensitive connection.

7. The method of claim 1 wherein the predetermined protocol is a channel state update protocol.

8. The method of claim 1 wherein the packet switched network is the Internet.

9. In a computer network with a plurality of network nodes, the network nodes having a packet switched connection to a packet switched network, selected ones of the network nodes having a delay sensitive connection to selected other ones of the network nodes, wherein the delay sensitive connection includes a plurality of individual delay sensitive channels, a method for determining a lowest cost delay sensitive connection, the method comprising the following steps:

maintaining on the network nodes status tables containing information from control messages sent over the packet switched connection to the network nodes indicating changes in status of delay sensitive connections in the computer network;

receiving a selection input on a first network node to create a delay sensitive connection to a second network node;

determining from the first network node with a status table a lowest cost connection path to create the delay sensitive connection, wherein the lowest cost connection path includes a shortest delay sensitive connection path, or a delay sensitive connection path with a desired quality of service; and establishing the delay sensitive connection from the first network node between the first network node and the second network node with the determined lowest cost delay sensitive connection path.

10. A computer readable medium having stored therein instructions for causing a central processing unit on a network node to execute the method of claim 9.

11. The method of claim 9 further comprising:

determining with the status table if all delay sensitive connection channels on the delay sensitive connection from the first network node to the second network node are idle, and if so, determining with a predictive release function when the delay sensitive connection can be released between the first network node and second network node.

12. The method of claim 11 wherein the predictive release function includes using statistical information collected for time of establishment, duration and time of release of delay sensitive connections in the computer network.

13. The method of claim 9 further comprising:

determining with the status table if all delay sensitive connection channels on the delay sensitive connection from the first network node to the second network node are idle, and if so, setting a timer with a predetermined timer value, wherein the predetermined timer value is based on the delay sensitive connection type; and removing the delay sensitive connection between the first network and the second network node when the timer expires.

14. The method of claim 9 wherein the step of determining with the status table a lowest cost connection path includes first checking selected ones of network nodes for available delay sensitive connection channels in the status table based on predetermined connection preferences before checking for available delay sensitive connection channels on other network nodes.

15. A computer network communication apparatus, the apparatus comprising in combination:

status receiver, for receiving a selection input on a first network node to change a status of a delay sensitive connection on a delay sensitive connection between a first network node and a second network node in a computer network;

status changer, for changing the status of the delay sensitive connection on the delay sensitive connection based on the selection input; and control message sender, for sending a control message with a predetermined protocol on a packet switched network from the first network node to other network nodes to other network nodes in a computer network indicating the change in status of the delay sensitive connection;

control message receiver, for receiving control messages from the packet switch connection;

status table, for storing the control messages in a status table in a memory of the apparatus;

16. The apparatus of claim 15 further comprising:

delay sensitive connection releaser, for releasing a delay sensitive connection with a predictive release function.

* * * * *